US010812482B1

(12) United States Patent
Xu et al.

(10) Patent No.: US 10,812,482 B1
(45) Date of Patent: Oct. 20, 2020

(54) PERMISSION VECTOR ACCESS CONTROL WITH LINEAR SCALING FACTOR

(71) Applicant: Amazon Technologies, Inc., Seattle, WA (US)

(72) Inventors: Donna Yinghui Xu, Detroit, MI (US); Michael Sturgis Terkowitz, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 316 days.

(21) Appl. No.: 15/861,607

(22) Filed: Jan. 3, 2018

(51) Int. Cl.
*H04L 29/06* (2006.01)
*G06F 9/50* (2006.01)
*G06F 21/60* (2013.01)
*G06F 21/30* (2013.01)

(52) U.S. Cl.
CPC ............ *H04L 63/10* (2013.01); *G06F 9/5011* (2013.01); *G06F 21/30* (2013.01); *G06F 21/604* (2013.01); *H04L 63/04* (2013.01)

(58) Field of Classification Search
None
See application file for complete search history.

(56) References Cited

U.S. PATENT DOCUMENTS

| 2008/0005115 | A1* | 1/2008 | Corley | G06F 21/6209 |
| 2013/0072160 | A1* | 3/2013 | Lawson | H04L 63/102 |
| | | | | 455/411 |
| 2015/0180872 | A1* | 6/2015 | Christner | H04L 63/10 |
| | | | | 726/4 |
| 2017/0295183 | A1* | 10/2017 | Movsisyan | H04L 63/102 |

* cited by examiner

*Primary Examiner* — Joseph P Hirl
*Assistant Examiner* — Hassan Saadoun
(74) *Attorney, Agent, or Firm* — Davis Wright Tremaine LLP

(57) ABSTRACT

A permission vector comprising a plurality of permission sets is used to manage permissions to resources of a resource provider. Each of the plurality of permission sets may correspond to a different resource of the resource provider, wherein each resource of the resource provider has an orthogonal relationship to the other resources. Each permission set may include one or more permission elements that define permissions granted to a user for accessing a corresponding resource element of a resource. The permission vector may be used to determine whether to fulfill user requests submitted to the resource provider to perform an operation that includes accessing a set of requested resources.

20 Claims, 8 Drawing Sheets

PERMISSION VECTOR ACCESS CONTROL WITH LINEAR SCALING FACTOR

BACKGROUND

Controlling access to data stored in the cloud is becoming a matter of paramount importance to commercial, consumer, and government entities alike. As the number of entities turning to network-based solutions for services and applications increases, so have the methods of controlling access to our sensitive data. Fine-grained access control methods, such as Role-based access control ("RBAC"), have been developed for controlling access to provide various ways to define access through policies or roles. Some existing fine-grained access control methods may be limited in providing access control below a certain level.

For example, for web-based application programming interfaces ("APIs"), access control can be provided on the API level, such that permissions are assigned to one API or a group of APIs. There are few, if any, solutions to providing fine-grained access control beyond the API level. A challenging aspect of providing access control beyond the API level is that the number of permissions grows rapidly and becomes difficult for both systems and users to manage—a problem known as "permission explosion." Another approach, attribute-based access control ("ABAC"), may solve some challenges associated with the permission explosion problem. However, ABAC also has some limitations that require a policy to be built on the permissions, and so it may not be applicable to API applications where permissions may need to be assigned without being defined in a policy.

BRIEF DESCRIPTION OF THE DRAWINGS

Various techniques will be described with reference to the drawings, in which.

DETAILED DESCRIPTION

Figure 1:
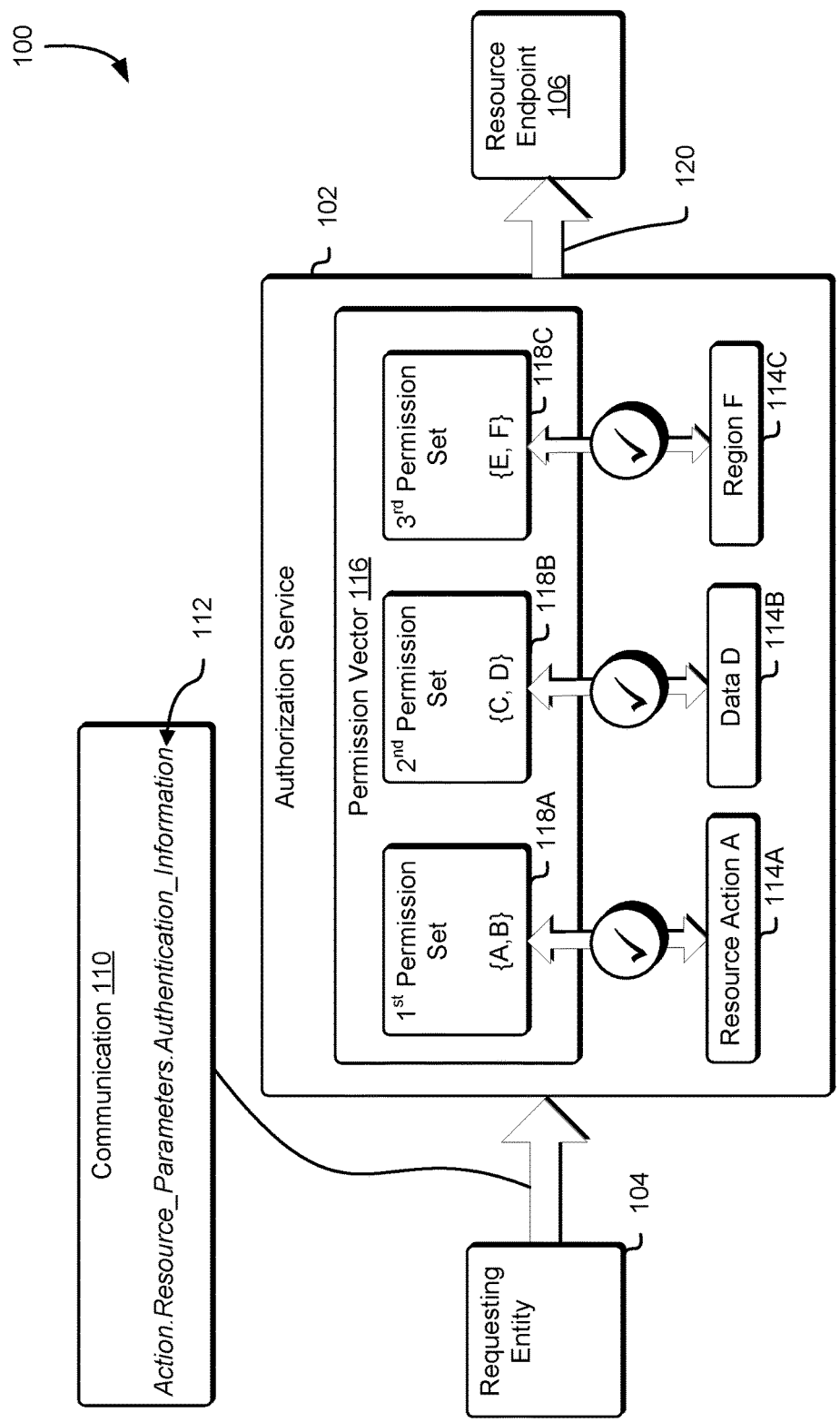
FIG. 1 illustrates an environment in which various embodiments of the present disclosure can be implemented.

Techniques described and suggested herein relate to providing fine-grained access control to resources of a resource service provider using a permission vector model. A permission vector comprising a plurality of permission sets may be generated for managing permissions to the resources of the resource service provider. Each of the permission sets may be designated as corresponding to a particular resource, such as a resource level, of the resource service provider. The resources of the resource service provider may be organized such that the resources are each defined as being orthogonal to the other resources. For instance, resources may be classified (e.g., by data type, by class) as being a separate resource such that changes to one resource does not affect other resources. As a result of defining the resources as being orthogonal, permission sets corresponding to one resource may be modified independently of the other resources. Similarly, each permission set may be stored as separate data objects (e.g., tables, matrices) in memory. Each permission set may comprise one or more permission elements that define permissions to a particular resource element of the resource, as described below. Using a permission vector model to control access to resources reduces the amount of memory required to store the permissions to scale in a linear way instead of scaling in a polynomial way.

An authorizing entity may independently define the permissions allowed to each user on a per-resource basis such that permissions one resource are granted independently of the other resources. A permissions generation service may generate a permission vector including the permission sets, and store the permission vector generated in a permissions data store. The permission vector may be stored in association with identification information of the user and/or the authorization entity. A user may send a request, to the resource provider, to perform an operation that includes accessing one or more of the resources. An authorization service of the resource provider may determine a set of requested resource elements of the resource provider to which access privileges are sufficient to fulfill the request. The authorization service may also obtain one or more permission vectors from the permissions data store to determine the permissions granted to the user.

The authorization service may evaluate the permission sets on a per-resource basis to determine whether the user has access privileges to the resource elements. Access privileges for the user may be sequentially determined such that access privileges to a first resource, such as an API resource, are determined as a condition precedent to determining access privileges to a second resource. As a result of successfully verifying that the user has sufficient access privileges to the requested resource elements, the authorization service may cause fulfillment of the request, such as by authorizing performance of the operation and access to the set of requested resources. Using the permission vector having a plurality of orthogonal permission sets, the number and complexity of permissions managed are reduced, as is the memory usage for storing the permissions.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 shows an illustrative example of an environment 100 in which an authorization service 102 determines whether to permit a requesting entity 104 to access to a set of resource endpoint 106 using a permission vector 116. The requesting entity 104 may communicate with the authorization service 102 to perform an operation associated with a resource endpoint 106 of a distributed resource provider.

The operation requests may include performing an action using data associated with various resources of the distributed service provider. The distributed resource provider may provide an environment within which one or more resources to customers. The resources may include applications, processes, services, virtual machines, data, and/or other computer system entities for providing one or more computing resources to customers. The authorization service 102 may be part of the resource provider or may be an entity, independent of the resource provider, who is authorized to authorize access to the resource endpoint 106, as described herein. The authorization service 102 may be a computing system comprising one or more processors and memory that stores executable instructions whose execution by the one or more processors causes the authorization service 102 to perform operations described herein. The authorization service 102 may be accessed via one or more API calls exposed to a user, service, application, or other computing entity of the resource service provider.

The requesting entity 104 may correspond to a computer system separate from the authorization service 102 and the resource endpoint 106. In one embodiment, the requesting entity 104 may be a computing system of an API resource that submits requests to computing systems of the resource provider for performing one or more operations, as described herein. In one embodiment, the requesting entity 104 may correspond to a computing service operated by a user (e.g., customer). The requesting entity 104 may send, or otherwise cause sending of, a communication 110 over a network, requesting performance of an operation in association with the resource endpoint 106. The communication 110 may comprise, associated with, or be useable to identify, a set of communication parameters 112 that are useable to determine a set of permissions. In one embodiment, the communication 110 may be a request to access a set of resources and for which permissions are determined as a condition for fulfillment. In one embodiment, the communication 110 may be a request to determine a set of permissions associated with an entity. In one embodiment, the communication 110 may be a notification of a condition for which a response may be generated based on determination of a set of permissions.

The communication parameters 112 may include an action to be performed and a set of resource parameters that are useable to identify a set of resources to which permissions are to be determined. Examples of resource parameters include an endpoint (e.g., resource identifier corresponding to the resource endpoint 106), a region identifier, data identifiers identifying data to access, and/or one or more parameters to be used in association with performance of the action. The communication 110 may be associated with or include authentication information useable to authenticate the communication 110 and/or requesting entity 104. The authentication information may include information identifying the requesting entity 104 and may include cryptographic information, such as a digital signature, a password, a certificate, or a token, useable to verify the requesting entity's proffered identity. In one embodiment, the communication 110 may be an application programming interface ("API") request, or a variant thereof, using a defined syntax (e.g., representational state transfer API, simple object access protocol API) and the one or more parameters to exchange data with a computing entity. In such an embodiment, the one or more of communication parameters 112 may be parameters of the API request.

The authorization service 102 may determine whether the requesting entity 104 has sufficient permissions associated therewith to fulfill the communication 110. The authorization service 102 may, in association with verifying permissions for the requesting entity 104, verify the identity of the requesting entity 104 and the authenticity of the communication 110 using the authorization information, for example. The authorization service 102 may, based on one or more of the communication parameters 112, identify resource elements 114 of the distributed resource provider that should be accessed to fulfill the communication 110. The authorization service 102 may obtain the permission vector 116 to determine whether the permissions granted to the requesting entity 104 are sufficient to access the resource elements 114. The permission vector 116 may include a plurality of permission sets 118 that define access privileges to the resource elements 114 of the resource provider. The resource elements 114, to which the permission sets 118 correspond, are configured to have an orthogonal relationship to each other. Orthogonality, as used herein, refers to the relationship of two or more resources to be modified without affecting the other resources in the relationship. Based on the orthogonal relationship of the resource elements 114, permissions for one resource element 114 may be granted independently of the other resource elements 114. As described below, the memory usage associated with maintaining permission vectors is reduced to a linear relationship in which the number of permission managed by the system is proportional to the sum of the number of permissions in the permission sets 118, rather than the product of the permissions required by other methods, such as RBAC and ABAC.

The authorization service 102 performs a tiered check on the permission sets 118 of the permissions vector 116 to determine whether sufficient permissions are associated with the requesting entity 104 to authorize fulfillment of the communication 110. For purposes of illustration, the authorization service 102 may determine that the request includes one or more resource action elements corresponding to operations to be performed by a web-based application or service, one or more data resource elements 114B corresponding to data classification elements of the application or service, and one or more region resource elements 114C corresponding to an associated geographic location. The authorization service 102 may verify, on a per-permission set basis, whether the permissions of a permission set 118 are sufficient to grant the requesting entity 104 to access the corresponding resource element 114 requested. In one embodiment, the permission sets 118 may be verified sequentially such that verification of one permission set is performed as a result of verifying another permission set of the permission vector. In one embodiment, the permission sets of a permission vector may be verified in parallel to one another. In such an embodiment, verification of one permission set 118 may be independent of verification of other permission sets of the permission vector. Moreover, verification of the permission sets 118 may be performed in any particular order or in a sequence. In one embodiment, however, verification of one permission set may be dependent upon previous successful verification of another permission set, as described below. The permission sets 118 may be verified in order of significance such that successful verification of one permission set 118 is a condition precedent to verifying a subsequent permission set 118.

In the environment 100, for instance, the authorization service 102 may first determine whether the first permission set 118A includes a permission corresponding to the requested resource element 114A. In particular, the authorization service 102 may compare the requested resource element 114A with the permission elements in the first permission set 118A. Because the permission set 118A of {A, B} includes permissions for "A" included in the resource element 114A, the authorization service 102 determines that the requesting entity 104 is authorized to access or cause performance of the resource action A. In a second verification, the authorization service 102 similarly determines that the requesting entity 104 is authorized to access the second resource element 114B because the Data "D" matches a permission specified in the second permission set 118B of {C, D}. In a third verification, determines that the requesting entity 104 is authorized to access data in the region F based on the inclusion of permissions for region F in the third permission set 118C of {E, F}. As a result of successfully verifying that the permission vector 116 includes permissions sufficient to allow access for the requested resource elements 114, the authorization service 102 may send a communication 120 to the resource endpoint 106 authorizing fulfillment of the communication 110. The resource endpoint 106 may perform, as a result of receiving the communication 120, one or more operations to fulfill the communication 110.

Figure 2:
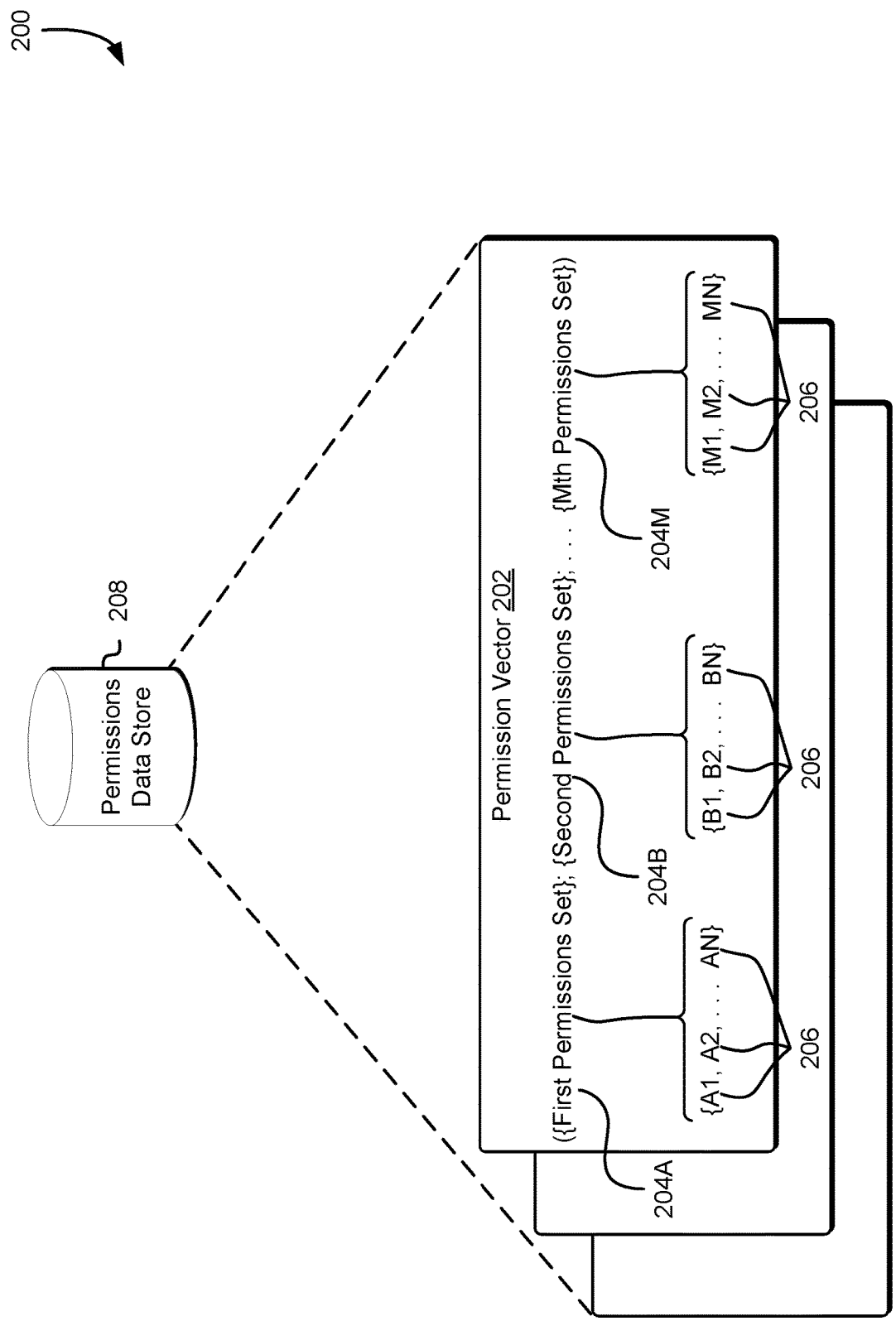
FIG. 2 illustrates an environment in which a permission vector is stored according to various embodiments of the present disclosure.

FIG. 2 shows diagram 200 of a permission vector 202 according to one or more embodiments described herein. The permission vector 202 comprises a plurality of permission sets 204 for defining permissions to access a resource of a resource provider. The permission sets 204 may each correspond to a different resource of the resource provider, and each permission set 204 may comprise one or more permissions 206 for accessing an aspect of the corresponding resource. A particular resource, as described below, may be defined as corresponding to each permission set 204 by any appropriate method, such as by indexing. Permission sets 204 and the permissions 206 thereof may have corresponding locations reserved in the data store 208. One or more alphanumeric values may be stored for each of the permissions 206 indicating one or more permissions granted or denied for the user. For instance, a value of zero may indicate that the user does not have permission. The alphanumeric value may indicate a level of permissions associated with the resource, such as a value indicating that the user has permissions to both read and write data in association with the resource.

The permissions vector 202 may be stored as information in a permissions data store 208. The permissions vector 202 may include information arranged in one or more data structures such that placement of data within those data structures may convey meaning. For instance, data elements horizontally organized may correspond to orthogonal permission sets 204 of a user with which the horizontal data elements are associated, and data elements vertically organized may correspond to permission sets 204 of different users. The permissions of each permission set 204 may be stored as values stored in association with the corresponding permission sets—for instance, the permissions may be stored as associative arrays indexed to permission sets.

The permissions data store 208 may include data storage media capable of storing, accessing and retrieving permission vector data, and may include any combination and number of data servers, databases, data storage devices and data storage media, in any standard, distributed, virtual or clustered environment. The permissions data store 208 may store one or more permission vectors 202 in association with users of the resource provider. The permission vectors 202 may be stored in the permission data store 208 on a per-user basis, and may be accessed by performing a data retrieval operation using an identifier of the user associated with the method, such as using a database query having a user identifier as an input parameter.

Figure 3:
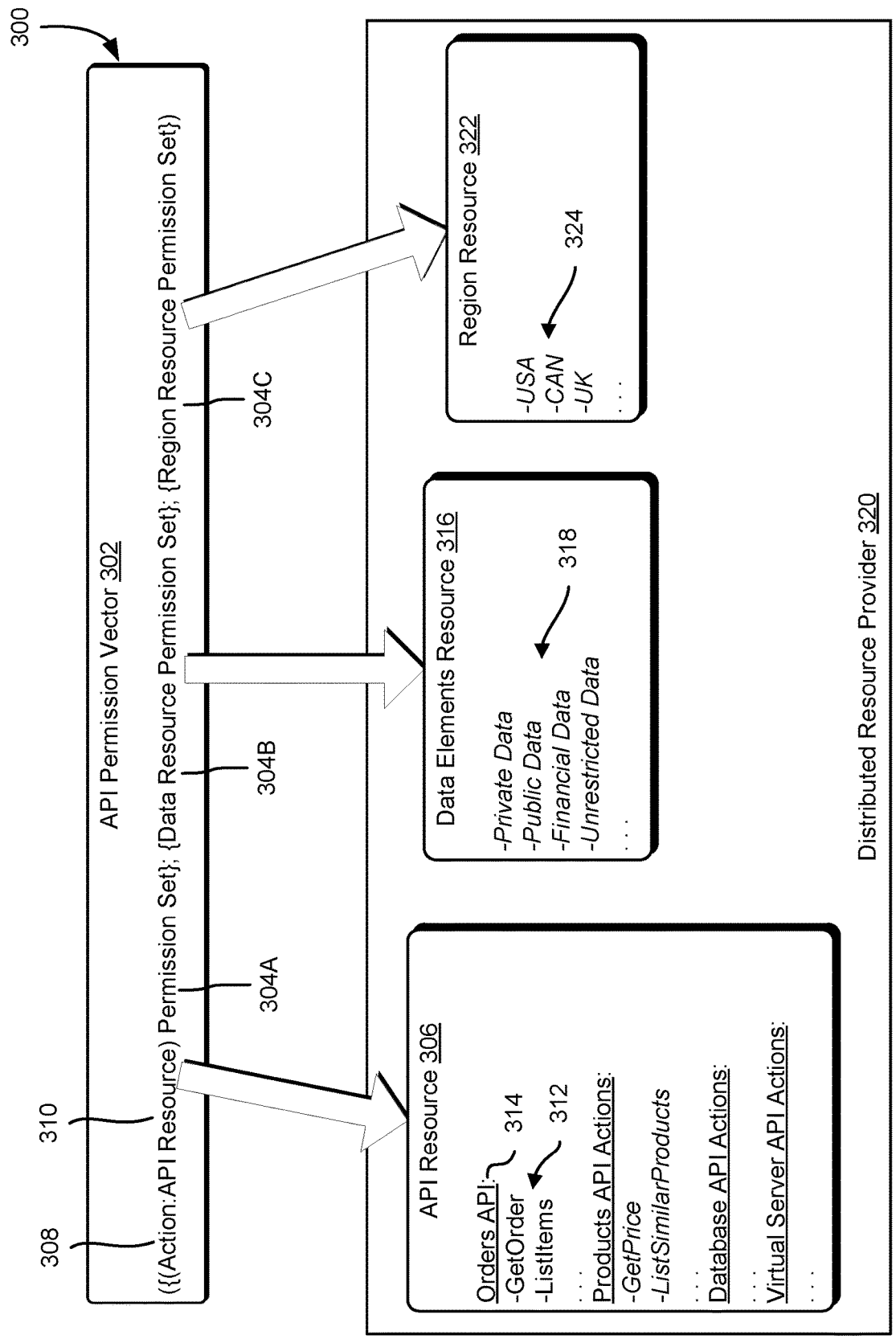
FIG. 3 illustrates an environment in which permission sets of the permission vector are defined on resources of a resource provider.

FIG. 3 shows a diagram 300 illustrating a correspondence of permission sets of a permission vector to resources of a distributed resource provider according to one or more embodiments described herein. An API permission vector 302 is a permission vector comprising a plurality of permission sets 304 specifying permissions to resources of a distributed resource provider 320. The permissions for each permission set 304 of the permission vector 302 may be granted independently of the other permission sets. For example, the permissions for a first permission set 304A may be granted independently of the permissions of a second permission set 304B and a third permission set 304C of the permission vector 302.

In one embodiment, one permission set may specify permissions to a major resource of the resource provider 320, and other permission sets may specify permissions to additional resources of the service provider 320. A major resource is a resource of the resource provider 320 that is responsible for performing operations in association with requests received. A major resource may be a resource to which API calls are addressed, although in some situations, the major resource may issue API calls to other API resources to fulfill requests. For example, an API resource 306 may be a major resource whereas a data elements resource 316 and a region resource 322 may be additional resources. The API resource 306 may correspond to a computer system of the distributed resource provider 320 that expose services and/or resources through APIs and process API requests received via APIs. For the API resources 306, an Orders API may be configured to perform operations on or using order information of orders that customers placed in a web-based marketplace if requested by a user having sufficient permissions. The Orders API 314, for example, may perform a "GetOrder" for a user for whom the first permissions set 304A includes the appropriate permissions—namely, a permission element granting an "GetOrder:Order API" permission.

The distributed resource provider 320 may include additional resources that have an orthogonal relationship to the major resource—here, the API resource 306. A data elements resource 316 may manage data on behalf of various entities, such as customers, developers, and other resources of the resource provider 320. Data managed by the data elements resource 316 are classified into different data classifications 318—for example, private data, public data, financial data, and unrestricted data, by way of non-limiting example. A region resource 322 may correspond to regional endpoints for receiving requests to the distributed resource provider 320. The location resource 322 may include endpoint locations for various regions. The endpoint locations may correspond to the location of a computer system endpoint receiving a request, or to which a request is addressed. In this case, locations or regions 324 are defined for each country, but the regions 324 may be defined by a larger or smaller scale in other embodiments (e.g., by state, by region). The respective resources of the API resource 306, the data elements resource 316, and the region resource 322 are defined as being orthogonal to one another because the data or operations of each respective resource may be modified independently of the other resources, without affecting the operations or data of the other resources. An authorized entity, such as a developer or administrator of the authorization system described herein, may define the permission sets included in a permission vector. For instance, the authorized entity may define a number of permission sets and a resource corresponding to each permission set. Information identifying the resource to which a permission set corresponds may be associated with the corresponding permission set. Such correspondence may be explicitly or implicitly defined in memory of the authorization service.

Each permission set may correspond to a particular resource of the resource provider 320. A first permission set 304A of the permission vector 302 may include a permission for an action 308 that is permitted in association with an API resource 310. The action 308 may correspond to an API action 312 that an API 314 is configured to perform. The permission vector 302 may include permission sets 304 corresponding to the additional resources of the resource provider 320. In particular, the second permission set 304B includes one or more permissions for permitting access to one or more of the data classifications 318. The third permission set 304C includes one or more permissions for permitting access to the regions 324. Each of the permissions for one permission set may be granted independently of granting the permissions of another permission set. Therefore, the number of permissions managed using a permission vector 302 is the sum of the individual permissions granted for all permission sets 304 of the permission vector 302. In one embodiment, one or more permission sets 304 of the permission vector 302 may be stored in and/or retrieved from data storage independently of another permission set 304. As described below, using a permission vector 302 comprising a plurality of permission sets 304 corresponding to independent resources enables fine-grained access control to be implemented to resources of the resource provider 320 without occupying a large amount of data storage space. Although illustration of the permission vector described herein, and the use thereof, is described with respect to three resources (e.g., API resource, data elements resource, region resource), use and configuration of the permission vector may be modified according to any system comprising any number and type of resources, as described below.

It should be noted that adding a new permission to one of the permission sets 304 or adding a new permission set to the existing permission sets has a linear impact. Using previous methods, adding a new permission increases the complexity in a polynomial way such that the Big O notation of such a change increases from $O(n*m*k)$ to $O(n*m*(k+1))$, for example. Adding a new permission set causes the complexity to increase from $O(n*m*k)$ to $O(n*m*k*j)$, where n, m, k, and j are integer values greater than or equal to one. By contrast, using the methods, systems, and processes described herein, adding a new permission is a linear change from $O(n+m+k)$ to $O(n+m+k+1)$, and adding a new permission set is a linear change from $O(n+m+k)$ to $O(n+m+k+j)$. Therefore, adding permissions, such as adding a new permission set in a permission vector or adding a new permission element to an existing permission set, according to the current method is scalable and does not cause permission explosion.

Figure 4:
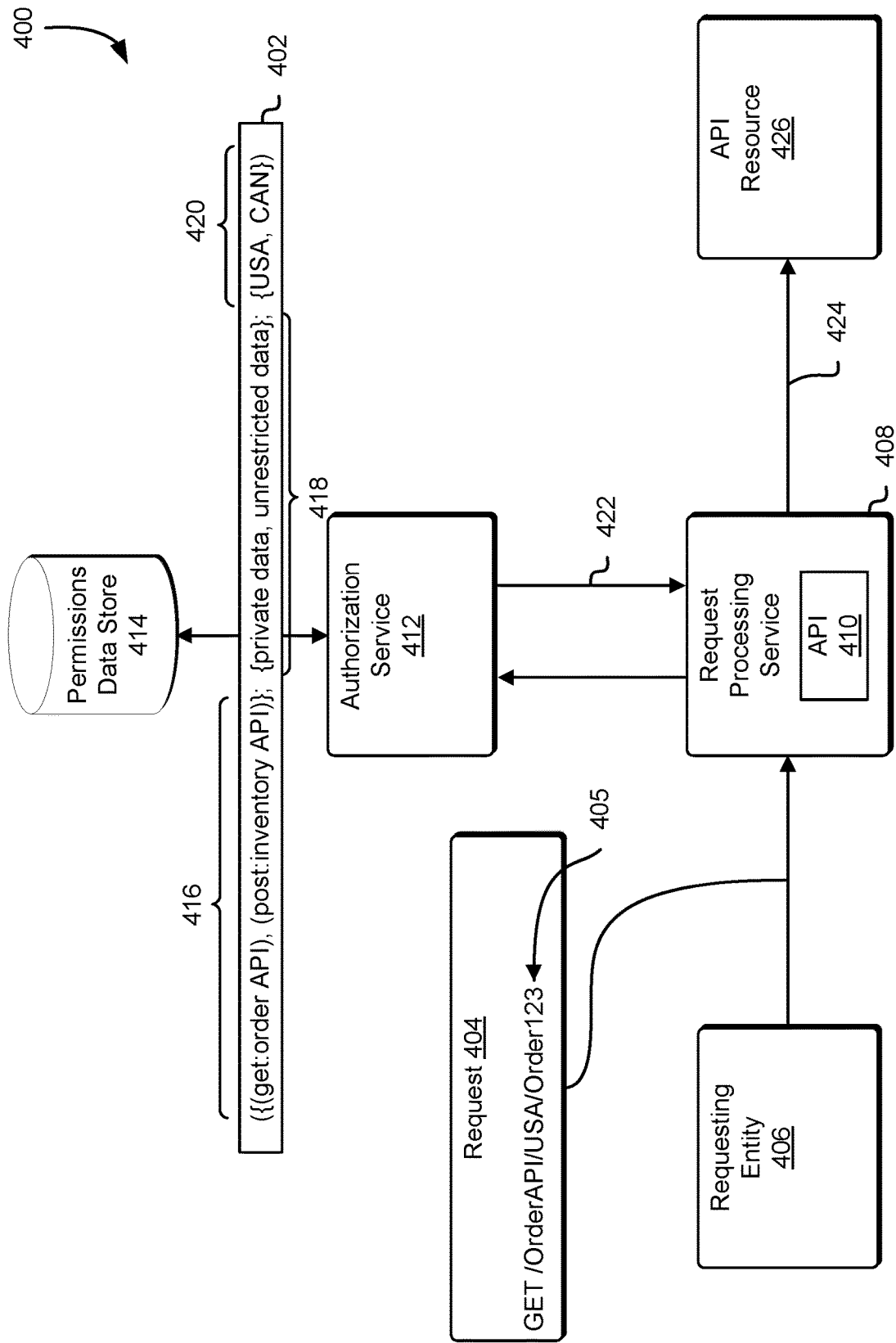
FIG. 4 illustrates an environment in which permissions of a requesting entity are evaluated using a permission vector to determine whether to authorize a request.

FIG. 4 shows an environment 400 in which a permission vector 402 is obtained to verify a request 404 to perform one or more operations. A request processing service 408 of a distributed resource provider may receive the request 404 over a network (e.g., the internet) from a requesting entity 406. The request 404 may be an API call initiated using an API 410 exposed to the requestor, and the request 404 may be formatted according to a syntax for generating API calls to the API 410. For instance, the request 404 may include a resource request 405 comprising one or more components, such as an action (e.g., "GET"), a requested resource (e.g., "Order API"), requested data (e.g., "Order123"), and a location of the data (e.g., "USA"). The request 404 may further include, or be associated with, identification information of the requesting entity 406 and cryptographic information useable to verify the identity of the requesting entity 406. The request processing service 408 may provide the resource request 405 to an authorization service 412 for determining whether the requesting entity 406 has permissions sufficient to authorize fulfillment of the resource request 405. In one embodiment, the request processing service 408 may process the request 404, such as by reformatting the resource request 405 into a different syntax, or extracting the components of the resource request 405. In one embodiment, the request processing service 408 may provide the resource request 405 as a result of verifying the authenticity of the request 404. The request processing service 408 may be a computer system comprising one or more processors and memory that stores executable instructions whose execution by the one or more processors causes the request processing service 408 to perform operations described herein.

The authorization service 412 may obtain the permission vector 402 from a permissions data store 414. The permission vector 402 may be obtained from the permissions data store 414 using an appropriate identifier associated with the permission vector 402, such as an identifier associated with the requesting entity 406 or an identifier associated with an authorizing entity defining the permissions. The permission vector 402 in this embodiment defines the permissions associated with the requesting entity 406. In one embodiment, the permissions data store 414 may be a database from which the permission vector 402 may be obtained using a database query including the entity identifier as a query parameter.

The permission vector 402 in FIG. 4 has three permission sets corresponding to the permission sets described above with respect to FIG. 3. In particular, a first permission set 416 defines permissions granted to the requesting entity 406 for an API resource, a second permission set 418 defines permissions granted to the requesting entity 406 for a data elements resource in each API, and a third permission set 420 defines permissions granted to the requesting entity 406 for an API region. The authorization service 412 may obtain, from the permissions data store 414, the appropriate permission sets for verifying permissions to the corresponding resources for which access is requested. Each permission set may be stored independently in the data store 414; although each permission set may be stored in association with the permission vector 402, and may be stored in association with an identifier of the user for whom access is requested (e.g., the requesting entity 406). Inclusion of a permission element in a permission set may indicate that a user has permission sufficient to access a corresponding resource element of a resource. The first permission set 416 has two permission elements for the API resource: 'get:order API' and 'post: inventory API'. According to the first permission set 416, the requesting entity 406 has permission sufficient for fulfillment of a 'GET' API call to the 'Order API', and permission sufficient for fulfillment of a 'POST" API call to an 'Inventory API'. The second permission set 418 has two permission elements for the data elements resource: 'private data' and 'unrestricted data'. According to the second permission set 418, the requesting entity 406 has permissions sufficient to access private data and unrestricted data. Finally, the third permission set 420 also has two permission elements for the API region: 'USA' and 'CAN'. The requesting entity 406, based on the third permission set 420, has permissions sufficient to access APIs in the United States and Canada. In its entirety, the permission vector 402 allows the requesting entity 406 has permissions sufficient to fulfill a 'Get:Order API' call and/or a 'Post:Inventory API' call with access to the private data and unrestricted data in the United States and Canada.

One advantage of the present method is that the data storage occupied by the permission vector 402 is smaller than it would be in other methods, such as RBAC or ABAC. In terms of Big O notation, the permission vector 402 uses an amount of memory that grows linearly with the number of permissions, such that the memory usage is O(n+m+k), where n, m, and k respectively correspond to the number of permission elements in the first permission set 416, the second permission set 418, and the third permission set 420. That is, the memory usage of the permission vector 402 is O(6). By contrast, the memory usage of other methods, such as RBAC and ABAC, increases in a polynomial way, such that the memory usage would be O(n*m*k); that is, a memory usage of O(8). Therefore, the problems of permissions explosion and role explosion is avoided using the methods, systems, and processes described herein.

In a process described below with respect to FIG. 5, the authorization service 412 compares the permission sets of the permission vector 402 with the components of the resource request 405 to determine whether the requesting entity 406 has sufficient permissions to authorize fulfillment of the request 405. In this instance, the permission vector 402 has sufficient permissions to authorize fulfillment of the resources requested in the resource request 405. Accordingly, the authorization service 412 may provide authorization 422 to the request processing service 408 notifying the processing service 408 that the requesting entity 406 has sufficient permissions. In response, the request processing service 408 may send a communication 424 to a target resource or API resource 426, such as the 'Order API', to fulfill the resource request 405. In one embodiment, the authorization service 412 may send the communication 424 authorizing fulfillment. In response, the API resource 426 may perform the requested operation; namely, retrieving ('Get') the 'Order123' data from the Order API.

Figure 5:
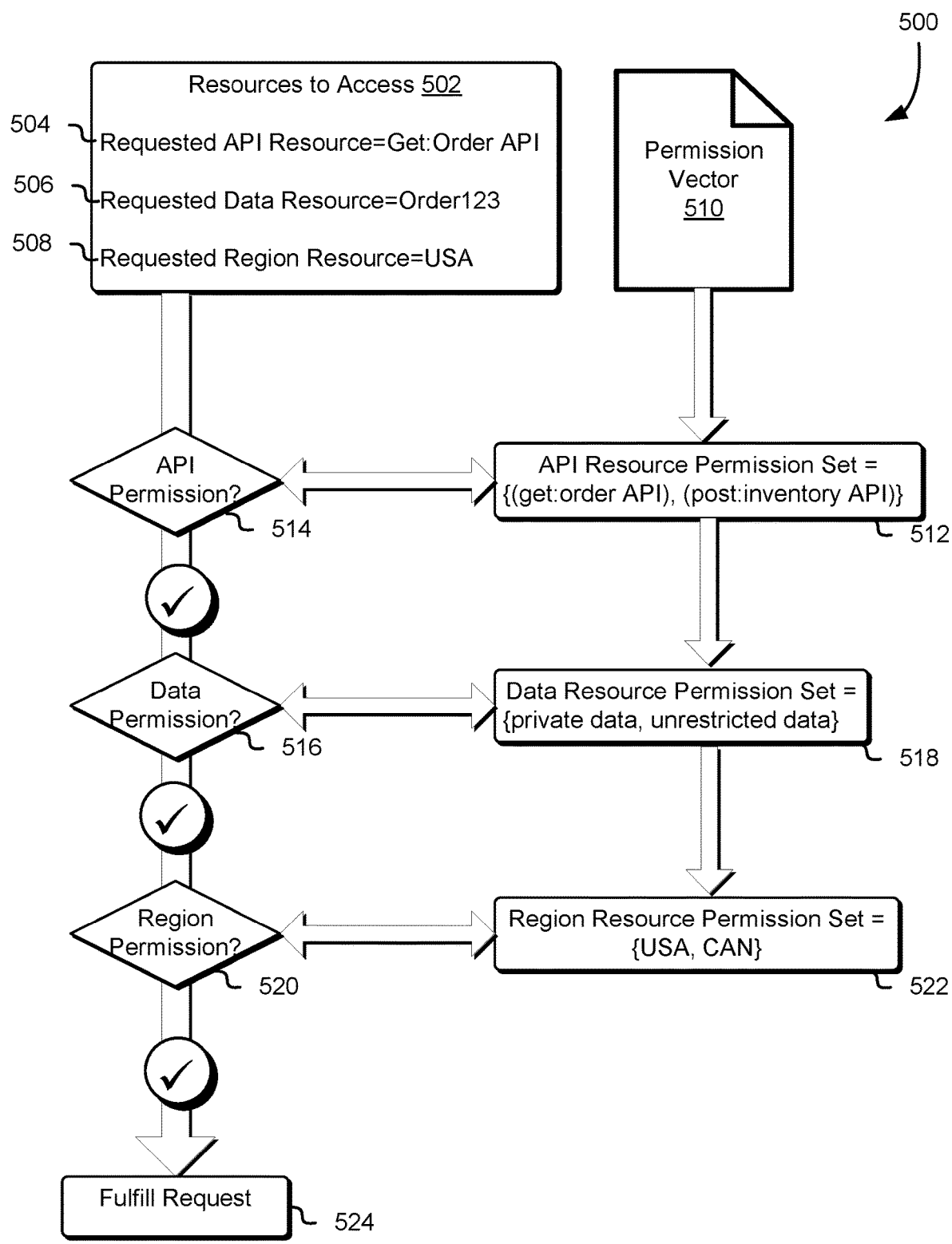
FIG. 5 illustrates a process for verifying that a requesting entity has sufficient permissions to access resources using the permission vector.

FIG. 5 shows a process 500 performed by the authorization service 412 to verify that a requesting entity has sufficient permissions associated therewith to authorize access to resources corresponding to a requested operation. The authorization service may determine a set of resources 502 to access based on a received communication (e.g., request, notification), and determine identification information associated with the request, such as an identifier of the requesting entity. The authorization service may identify the respective resources of the resource provider for which to determine permissions. In one embodiment, where the authorization service receives the request, identifying the respective resources may include extracting the respective resources from the request. The authorization service identifies that a first requested resource 504 is an 'Order API' resource. Further, because an action, 'Get', is associated with the first requested resource 504, the authorization service may determine that the first requested resource 504 is a major resource, as discussed above. The authorization service may identify that a second requested resource 506 of 'Order123' is a data element resource classified as 'private data', and identify that a third requested resource 508 is a region resource in the United States.

The authorization service may obtain, from permissions data storage, a permission vector 510 using the identification information associated with the request received—for example, by sending a database query to the permissions data storage using the identification information as a parameter. The authorization service may then perform a tiered check on the permission sets of the permission vector 510 to determine whether the requesting entity has sufficient permissions to access the requested resources 502. For a first permission evaluation 514 on the API permissions, the authorization service obtains an API resource permission set 512 from the permissions vector 510 to determine whether the requesting entity has permission to access the 'Get:Order API'. The authorization service may compare each permission element in the API resource permission set 512 to the requested API resource 504 and, if a permission element in the permission set 512 allows access to the requested API resource, the authorization service may proceed to the next evaluation. If none of the permission elements in the API resource permission set 512 allow access to the requested API resource, then the authorization service may decline authorization of the request. In this instance, the API resource permission set 512 includes a permission element indicating that the requesting entity is permitted to access the requested 'Get:Order API' resource, so the authorization service proceeds to the next evaluation.

For a second permissions evaluation 516, the authorization service obtains a data resource permission set 518 from the permissions vector 510 to determine whether the requesting entity has permissions to access the requested data resource 506. The authorization service may determine that a data element classification for the requested 'Order123' data is private data based, for example, on metadata associated with the requested data. The authorization service may compare each permission element in the data resource permission set 518 to the requested data resource 506 and, if a permission element in the permission set 518 allows access to the requested data resource, the authorization service may proceed to the next evaluation. Otherwise, the authorization service declines authorization of the request. Here, the data resource permission set 518 includes a permission element indicating that the requesting entity is permitted to access the requested 'Order123' data, which is 'private data'. Proceeding to the final evaluation 520, the authorization service determines whether the requesting entity has sufficient permissions for the requested region. Evaluating each of the permissions in a third permission set 522 obtained from the permission vector 510, the authorization service determines that the third permission set 522 includes a permission element permitting the requesting entity to access data in the 'USA' region. As a result of successfully verifying that the permission vector 510 comprises permission sets permitting the requesting entity to access the requested resources 502, the authorization service may cause fulfillment of the request to access the resources, such as by providing a notification 524 to the Order API resource to fulfill the request.

In the example described with respect to FIG. 5, permissions for resources are described as being determined in series. In such an example, a determination of whether a user's permissions are sufficient to access a second resource is performed using a second permission set prior to a determination of whether a user's permissions are sufficient to access a first resource using a first permission set. In one embodiment, the determination of permissions may be performed in parallel such that a determination of permission for one resource is determined independently of another resource. The second permission evaluation 516 may be performed, for example, independently of the first permission evaluation 514. For instance, the permission sets may be verified in any order, and the verification of one permission set may not have an effect on a result of verification of another permission set, or even whether verification of another permission set is performed. A successful determination that the user has sufficient permissions to access a first resource corresponding to the first permission set 512 may not be a condition precedent to performance of the second permission evaluation 516. As another example, the authorization service may cause performance of a separate process (e.g., system process, task, thread, instance) for each permission evaluation such that a result is returned independently for each permission evaluation. A determination of whether a user has sufficient permissions for fulfillment of a request, for example, may be based on a plurality of separately determined results, each result being for a different permission set.

Although the permission vector described herein is described with respect to permissions for web-based APIs, the permission vector is not limited to such applications, and may be used in other areas of fine-grained access control. Moreover, the methods, systems, and processes herein are applicable to permissions for any type and any number of resources. The permission vectors can be generated for any system in which permissions can be defined in a multi-orthogonal manner. A database service or system, for instance, may comprise n number of tables and m data elements in each table. In such a system, a permission vector may be defined for granting permissions to tables independently of granting permissions to data groups within the tables. For instance, the data elements of the tables may be categorized into m data groups and n tables, wherein each table includes data categorized into one of the m data groups. A permission vector may be generated comprising a first permission set corresponding to permissions for tables, and a second permission set corresponding to permissions for data elements within the tables. Further, an action may be defined on the first permission set or the second permission set. A permission vector for a database service may therefore be designed as ({(action: table) permission set}, {data group permission set}). For instance, a permission vector may be defined as follows:

(Get:{Table 1, Table 5, Table 6, Table 8}, {private data, financial data})

which indicates that permissions granted allowing a user to get the private data and financial data in Table 1, Table 5, Table 6, and Table 8. The number of permissions managed in such an example are (n+m) or six, which is linearly scalable as permission sets and/or permission elements are added. As described below, additional permission vectors may be added for a user to adjust the scope of permissions.

Figure 6:
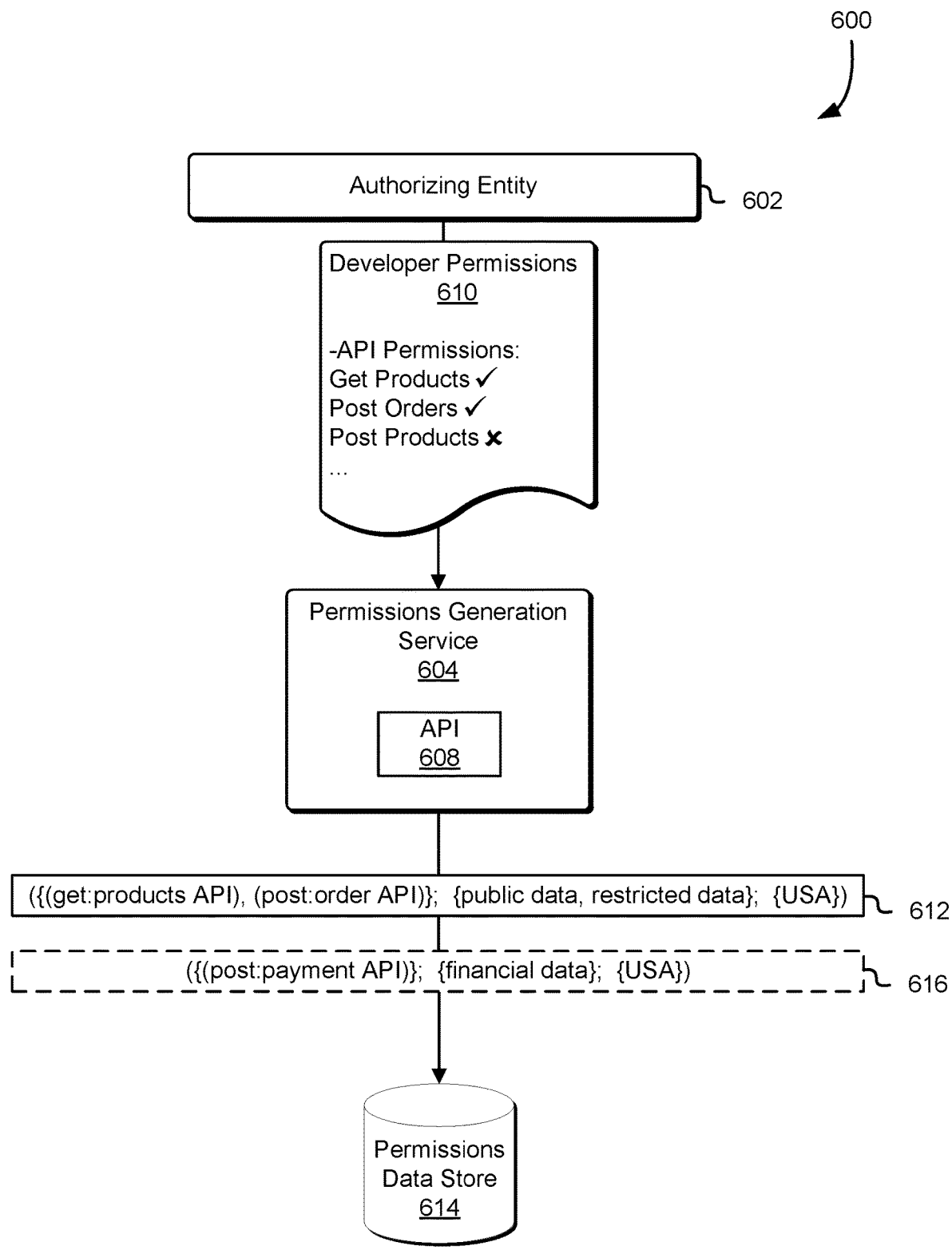
FIG. 6 illustrates an environment in which a permission vector is generated based on input from an authorizing entity.

FIG. 6 shows an environment 600 in which an authorizing entity 602 defines permissions for a user. The authorizing entity 602 may be an entity having authority over some or all of the data and/or operations performed by a resource of the resource provider. For example, in a scenario where the resource provider provides one or more resources to facilitate electronic commerce, the authorizing entity 602 may be a seller that maintains private data on behalf of its buyers (e.g., address, purchase history, credit card information). The authorizing entity 602 may wish to permit a developer, who is developing software for selling the seller's products software using one or more resources of the resource provider. The authorizing entity 602 may wish to permit the developer to access certain API resources and data element resources in certain regions.

The authorizing entity 602 may interact with a permissions generation service 604 to generate a permissions vector 606. The permissions generation service 604 may expose an API 608 through which the authorizing entity may make API calls to establish permissions for the developer. The authorizing entity 602 may send developer permissions information 610 to the permissions generation service 604 indicting the permissions granted and/or denied to the developer. In this example, the developer permissions 610 indicate that the developer is granted permissions to a 'Get:Products' API and a 'Post:Orders' API, but denied permissions to 'Post:Products' API. The developer permissions 610 may include permissions for other resources, such as data elements resources and region resources, as described herein.

The permissions generation service 604 may process the developer permissions 610 provided by the authorizing entity 602 and generate a permission vector 606 defining permissions for the developer. The permission vector 606 may include one or more permission elements for a plurality of permissions set, as described herein. The permissions generation service 604 may build a data structure for one or more of the plurality of permission sets. The data structure may be a hash map or other key-value storage structure in which key-value pairs are stored according to values generated by applying a hash function to a key (e.g., cryptographic key). In one embodiment, the hash map may be a distributed hash map stored over multiple storage nodes. By building a hash table for each permission set in the permission vector, the computational complexity corresponds to the number of permission sets in the permission vector, which, in Big O notation, is O(1) (i.e., is constant). For instance, adding a permission to a permission set does not affect the computation complexity required because the computation complexity is the number of dimensions in the permission vector, which is O(1). By contrast, according to other approaches, such as RBAC or ABAC, the computation complexity is O(n*m*k)—greater than the computation complexity of the permission vector approach described herein. Computational complexity may refer to the amount of computing resources required to perform a set of operations (e.g., number of computing cycles in a given time, amount of volatile memory).

Additional permission sets may be added to modify or adjust the scope of permissions. The permission vector may be added without having to again compute every permission, as with the RBAC system described herein. In one example, the authorizing entity 602 may wish to allow a seller to post their financial data for receiving payment without exposing a customer's data to the seller. The authorizing entity 602 may, via the permissions generation service 604, cause generation of a second permission vector 616. The second permission vector 616 allows the user to post financial data through a payment API in the USA. This second permission vector 616 is independent of the first permission vector 606, and therefore does not expose customer financial data to the seller. Additionally, the amount of memory and computation to adjust the scope of permissions scales linearly, whereas modifying the permissions in a different permissions system may require additional computation and use more memory. For instance, the amount of memory used is O(n+m+k) or O(3+3+2) rather than O(n*m*k) or O(3*3*2) as it might be in other systems. Moreover, computation is reduced, as generating a new permission vector does not require determining a permission for every input combination, as it may in other systems. Permission vectors generated may be stored in a permissions data store 614, as described herein.

Figure 7:
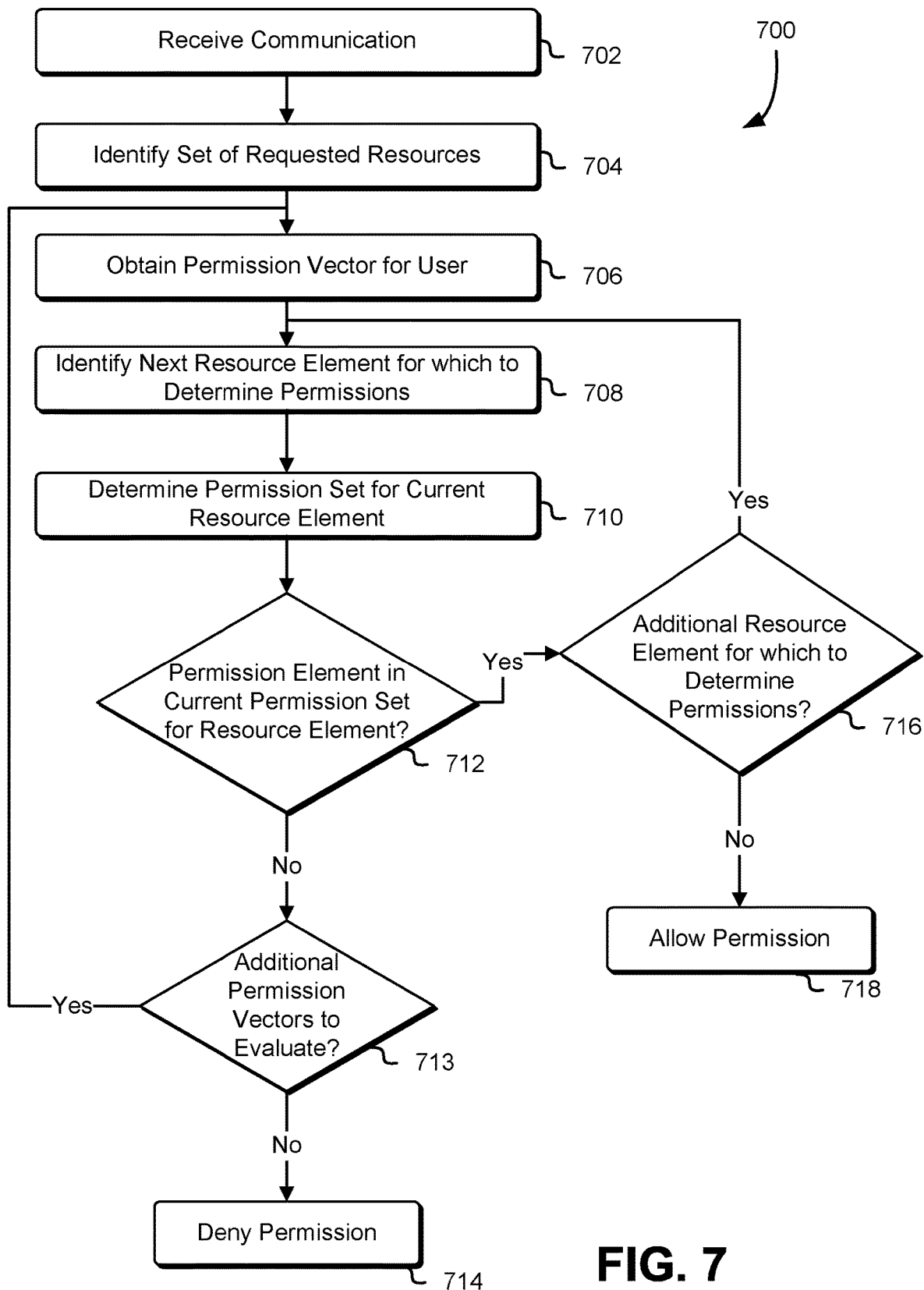
FIG. 7 illustrates a process for determining whether to authorize fulfillment of a request using a permission vector.

FIG. 7 shows a process 700 for determining whether a user has sufficient permissions to grant fulfillment of a request according to one or more embodiments described herein. The process 700 may be performed by any appropriate entity described herein, such as the authorization service. The process 700 begins by receiving 702 a communication for which a set of permissions are to be determined. The communication may be a request from a requesting entity to perform an operation, such as the API operations described herein. The communication may be a notification associated with an operation to be performed, such as an operation to access customer data or a notification regarding pending publication of an order received to a user. Performing the operation may include accessing a set of resources of the resource provider, such as an API resource, a data elements resource, or a region resource, as described above, or may include accessing other resources. The request may include information identifying the requesting entity and may include a resource identifier identifying the set of resources associated with the operation. The authorization service may then identify 704 a set of requested resources based on information included in the request, such as by identifying the resources to which the requesting entity should have permission in order to fulfill the request. The authorization entity may obtain 706 a permission vector, from data storage, corresponding to the requesting entity. For instance, the authorization entity may initiate a database query to retrieve the permission vector, and that the database query may include the information identifying the requesting entity.

The authorization service may identify 708 a resource element corresponding to the requested resources for which permissions should be determined. For instance, the authorization service may identify that the resource identifier specifies an API operation and API resource for which permissions should be determined in order to fulfill the request. The authorization service may determine 710 a permission set of the permission vector that corresponds to the resource element determined in step 708. As described above with respect to FIG. 3, for example, the authorization service may identify an API resource permission set of the permission vector to use for evaluating whether the requesting entity has sufficient permissions to access the requested API resource. In the next step, the authorization service evaluates 712 whether a permission element in the permission set determined in step 710 includes permissions sufficient to grant access to the resource element requested. If the permission set does not include sufficient permissions to grant access, then the authorization service may determine 713 whether there are additional permission vectors to evaluate for the user. If so, the authorization service may obtain 706 another permission vector for the user and evaluate that permission vector to determine whether sufficient permissions are included in the permission vector, as described above. If no additional permission vectors are associated with the user, the authorization service may deny 714 permission to access the resources associated with the communication, such as by rejecting fulfillment of the request. If, on the other hand, the permission set includes permissions sufficient to grant access to the resource requested, then the authorization service may record that the requesting entity has sufficient permissions to the resource element, and proceed to step 716.

The authorization service may determine 716 whether there are any additional requested resource elements for which permissions remain to be determined using the permission vector. For example, after evaluating permissions for the requested API resource, the authorization service may evaluate permissions for the requested data elements resource. Determining 716 may include identifying whether the user has been confirmed to have sufficient permissions for every resource for which access was requested. If no additional resource elements remain to be evaluated, the authorization service may determine that the request is authorized and allow 718 permission associated with the communication, such as by causing fulfillment of the request, such as by providing notification to the requested resources indicating that the requesting entity is authorized for fulfillment of the request. If additional resource elements remain to be evaluated, the authorization service may return to step 708 to identify the next requested resource element for which to determine permissions.

Figure 8:
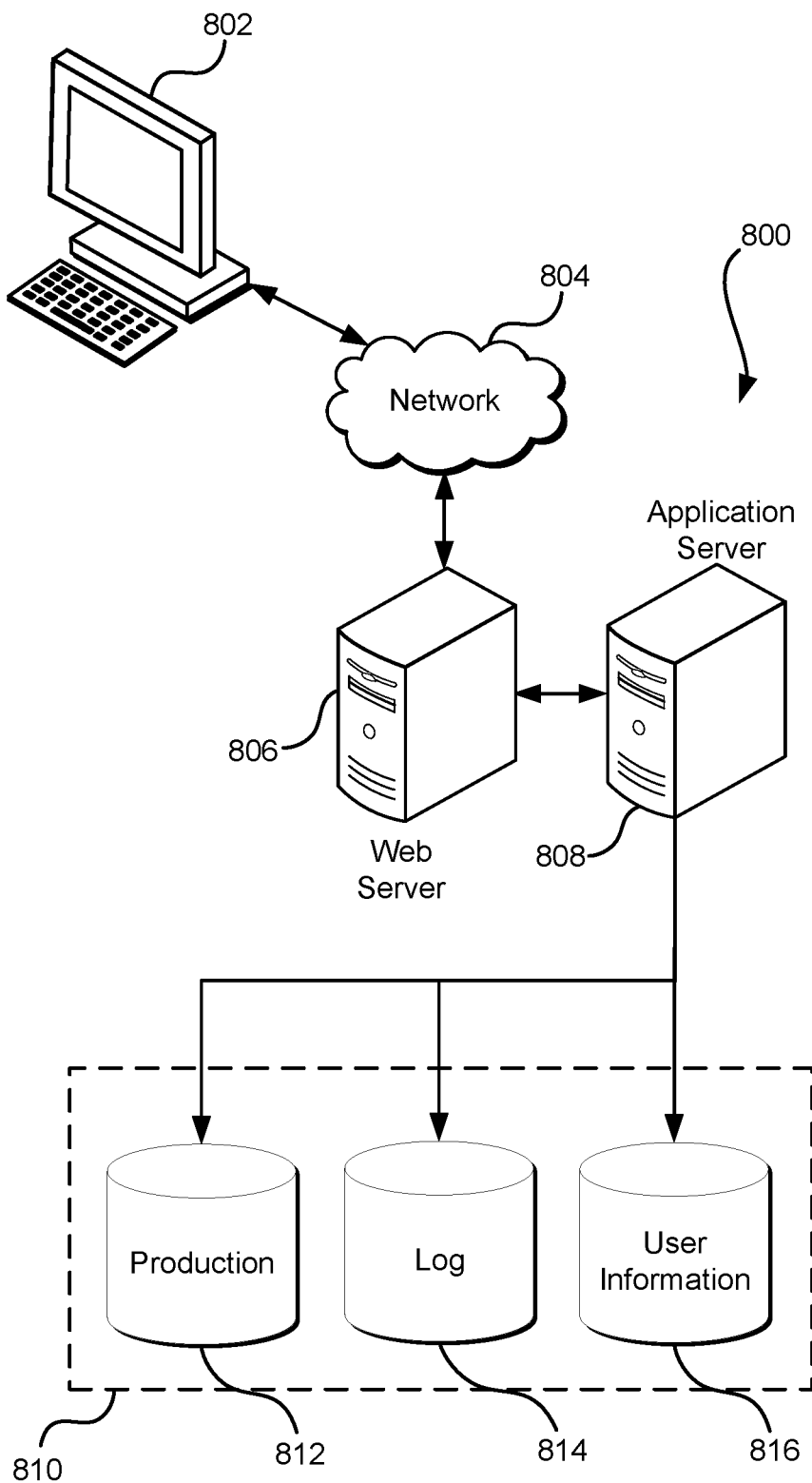
FIG. 8 illustrates an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages, or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation ("JSON"), and/or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 802 and the application server 808, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. The application server 808 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
receiving, via an application programming interface, a request to perform an operation associated with accessing a set of resources, the request associated with a requestor identifier and including a resource identifier;
determining, based on the resource identifier, a set of requested resources corresponding to the resource identifier;
obtaining, based on the requestor identifier, a permission vector including a plurality of permission sets that are orthogonal to each other, wherein individual permission sets of the permission vector define permissions for accessing data associated with the set of resources, and the individual permission sets further comprise one or more permission elements corresponding to a resource of the set of resources;
determining whether a resource element of a first permission set of the permission vector matches a first requested resource of the set of requested resources;
determining whether a resource element of a second permission set of the permission vector matches a second requested resource of the set of requested resources; and
as a result of determining that the resource element of the second permission set matches the second requested resource, causing fulfillment of the request to perform the operation by at least permitting access to the set of requested resources.

2. The computer-implemented method of claim 1, further comprising determining that a resource element of a third permission set of the permission vector matches a third requested resource of the set of requested resources.

3. The computer-implemented method of claim 1, wherein the resource element of the second permission set is determined as a result of determining that the resource element of the first permission set matches the first requested resource.

4. The computer-implemented method of claim 1, wherein the plurality of permission sets are stored independently of each other in a permissions database.

5. A system, comprising:
memory storing instructions, as a result of being executed by at least one or more processors, cause the system to at least:
obtain, responsive to receiving a communication associated with accessing a set of resource elements of a resource provider, a permission vector comprising a plurality of permission sets that correspond to a plurality of resources of the resource provider, wherein the plurality of permission sets include permission elements that define permissions of a user to access a corresponding resource of the plurality of resources;

verify that a permission element of a first permission set includes a permission sufficient to access a corresponding first resource of the set of resource elements;

verify that a permission element of a second permission set includes a permission sufficient to access a corresponding second resource of the set of resource elements, the first resource being orthogonal to the second resource; and permit access to the set of resource elements.

6. The system of claim 5, wherein the permission vector is obtained from data storage using a database query, the database query including an identifier of the user as a query parameter.

7. The system of claim 5, wherein verifying the permission element of the second permission set is performed as a result of successfully verifying that the permission element of the first permission set includes the permission sufficient to access the corresponding first resource.

8. The system of claim 5, wherein a first resource of the plurality of resources is an application programming interface resource of a distributed application programming interface system.

9. The system of claim 5, wherein a first permission set of the plurality of permission sets corresponds to an application programming interface resource and an operation is defined for performance on the application programming interface resource.

10. The system of claim 9, wherein a second permission set of the plurality of permission sets corresponds to a set of permissions on a data element resource orthogonal to the application programming interface resource.

11. The system of claim 10, wherein a first resource element of the second permission set defines permissions for using data of a first classification, and a second resource element of the second permission set defines permissions for using data of a second classification.

12. The system of claim 5, wherein verifying the permission element of the second permission set is performed in parallel to verifying the permission element of the first permission set.

13. A non-transitory computer-readable storage medium having stored thereon executable instructions that, as a result of being executed by one or more processors of a computer system, cause the computer system to at least:

obtain, as a result of receiving a communication associated with accessing a set of resource elements, and based on an identifier of a user associated with the communication, a permission vector comprising a plurality of permission sets corresponding to a plurality of resources, wherein the plurality of permission sets include permission elements defining permissions to a corresponding resource of the plurality of resources;

verify that at least one of the permission elements of the permission sets include a permission sufficient to permit the user to access a corresponding resource of the set of resource elements; and permit access to the set of resource elements as a result of verifying the plurality of permission sets.

14. The non-transitory computer-readable storage medium of claim 13, wherein the communication includes a plurality of resource identifiers, and verifying the plurality of permission sets includes successively verifying permission elements of the plurality of permissions against respective resource identifiers.

15. The non-transitory computer-readable storage medium of claim 13, wherein verifying whether a second permission set specifies a permission sufficient to permit the user to access a resource element is dependent upon previous verification that a first permission set specifies a permission sufficient to permit the user to access a different resource element.

16. The non-transitory computer-readable storage medium of claim 13, wherein verifying a permission element for a second permission set of the permission vector is performed independently of verifying a permission element for a first permission set.

17. The non-transitory computer-readable storage medium of claim 13, wherein increasing permissions of an individual permission set of the plurality of permission sets causes a linear impact to memory usage for storing the permission vector.

18. The non-transitory computer-readable storage medium of claim 13, wherein one or more of the plurality of permission sets include a plurality of permission elements that respectively define a permission to a particular resource element of the corresponding resource.

19. The non-transitory computer-readable storage medium of claim 13, wherein the executable instructions, as a result of being executed by the one or more processors of the computer system, further cause the computer system to obtain a second permission vector comprising a plurality of permission sets corresponding to the plurality of resources, wherein obtaining the permission vector is a result of a determination that the second permission vector does not include permissions sufficient to permit the user to access the set of resource elements.

20. The non-transitory computer-readable storage medium of claim 13, wherein individual permission sets of the plurality of permissions sets are stored as hash maps in data storage.

* * * * *